INVENTORS
LAWRENCE P. BREITENBACH
BY MORDECAI SHELEF
ATTORNEYS

United States Patent Office 3,730,686
Patented May 1, 1973

3,730,686
QUANTITATIVE MEASUREMENT OF SELECTED NITROGEN COMPOUNDS IN GASEOUS MIXTURES
Lawrence P. Breitenbach, Royal Oak, and Mordecai Shelef, Southfield, Mich., assignors to Ford Motor Company, Dearborn, Mich.
Filed June 29, 1971, Ser. No. 158,003
Int. Cl. C01b 21/00, 21/20; G01n 31/10
U.S. Cl. 23—232 R
20 Claims

ABSTRACT OF THE DISCLOSURE

Gaseous mixtures including nitrogen dioxide are passed through a converter containing molybdenum at a temperature of about 475° C. to convert the nitrogen dioxide to nitric oxide without converting significant amounts of any existing ammonia and without destroying any existing nitric oxide. The gaseous mixture leaving the converter is introduced into a reaction chamber where the chemiluminescence of the reaction of the nitric oxide and ozone is used to determine the amount of nitrogen dioxide in the original gaseous mixture. Subsequently, the gaseous mixture is passed through a second converter containing copper at a temperature of about 410° C. to convert any ammonia to nitric oxide and the increased chemiluminescence is used to determine the amount of ammonia in the original mixture.

BACKGROUND OF THE INVENTION

This invention relates to the subject matter of U.S. patent application Colvin et al. Ser. No. 146,929 entitled "Chemiluminescent Instrument" and Warnick et al. Ser. No. 146,927 entitled "Chemiluminescent Process," both filed on May 15, 1971.

The inventions described in these related applications provide a chemiluminescent detector capable of measuring widely varying amounts of nitric oxide in gaseous mixtures with excellent accuracy, sensitivity, and reproducibility. Gaseous sample mixtures from the atmosphere, the combustion products of automotive engines and other power plants including aircraft engines and furnaces, and gases involved in various chemical processes can be analyzed on a continuous basis with the detector.

Many of these gaseous mixtures also contain various amounts of other nitrogen compounds such as nitrogen dioxide and ammonia and it sometimes is desirable to determine the amounts of such compounds in the gaseous mixtures. Fresh combustion products of automotive engines generally contain virtually no nitrogen dioxide, but storing the combustion products converts some of the nitric oxide into nitrogen dioxide and such nitrogen dioxide must be reconverted to nitric oxide to obtain an accurate analysis. Many of the catalysts being developed for automotive catalytic converters produce some ammonia that must be measured to obtain an accurate picture of converter performance. The ammonia content of gaseous mixtures used in biological processes also is of considerable importance.

One known technique of converting nitrogen dioxide to nitric oxide for use in chemiluminescent detectors involves contacting the gaseous sample mixture with heated stainless steel. Careful analysis has shown, however, that operating stainless steel at the temperature necessary to convert nitrogen dioxide to nitric oxide also converts to nitric oxide about 80 percent of any ammonia existing in the gaseous mixture. Thus the stainless steel converter does not provide an accurate analysis of sample mixtures containing unknown quantities of nitrogen dioxide and ammonia. Devices using absorbent or adsorbent forms of carbon to remove any ammonia have been proposed for use in conjunction with such converters, but such devices increase considerably the structural and operational complexity of the detector. Moreover, such forms of carbon tend to absorb or adsorb portions of the nitric oxide and the nitrogen dioxide.

SUMMARY OF THE INVENTION

This invention provides a process for measuring the amounts of selected gaseous nitrogen compounds including nitric oxide, nitrogen dioxide and ammonia in a gaseous mixture. The process is based on the discovery that contacting the gaseous mixture with certain materials maintained at selected temperatures permits substantially complete conversion of nitrogen dioxide to nitric oxide without significant conversion of ammonia and without destroying any significant amount of existing nitric oxide. Measuring the amount of nitric oxide in the resulting mixture and comparing the value with the amount of nitric oxide in the original mixture produces a measure of the amount of nitrogen dioxide.

To determine the amount of ammonia in the gaseous mixture, the gaseous mixture then is placed in contact with copper at a selected temperature to convert substantially all nitrogen dioxide and ammonia to nitric oxide. Measuring the amount of nitric oxide in the resulting mixture produces a value representative of the combined amounts of nitric oxide, nitrogen dioxide and ammonia in the original mixture. Simple computations then produce the amounts of each compound in the original mixture.

Passing the gaseous mixture through an elongated tube containing heated molybdenum, manganese, silver, vanadium or tungsten converts substantially all nitrogen dioxide to nitric oxide without destroying any nitric oxide in the original mixture and without converting excessive quantities of any ammonia. Molybdenum is preferred because it is highly selective; molybdenum heated to about 475° C. produces substantially complete conversion of any nitrogen dioxide without converting more than about 5 percent of any ammonia. Satisfactory results can be obtained by maintaining the molybdenum between about 400° C. and about 550° C. with the preferred temperature range being about 450–550° C. Conversion efficiency usually begins diminishing rapidly at temperatures below 400° C. and nitric oxide deterioration usually begins occurring at temperatures above 550° C. Manganese and silver can be substituted for the molybdenum with just a slight increase in the proportion of ammonia conversion at the temperature capable of producing complete conversion of nitrogen dioxide. Vanadium and tungsten also can be substituted but with a slightly greater proportion of ammonia conversion at the conversion temperature.

The effective life of the molybdenum is improved considerably by utilizing the molybdenum in the presence of carbon. A dense spectrographic grade carbon preferably is used and finely divided molybdenum can be applied thereto by dipping the carbon in a dilute solution of a molybdenum salt and subsequently reducing the molybdenum salt to elemental molybdenum with hydrogen. Improved life of the other metals also is achieved by using the metals with carbon.

Dense forms of carbon do not absorb or adsorb significant amounts of nitric oxide, nitrogen dioxide, or ammonia and consequently permit faster operation. Less dense forms of carbon such as carbon black, charcoal, graphite, etc. can be used but necessitate a break-in period for each operation to permit absorption and adsorption equilibrium. The preferred dense forms of carbon typically have a density of at least about 90 percent of theoretical.

An elongated tube containing copper can be used to convert all ammonia and nitrogen dioxide to nitric oxide. Best conversion effectiveness is obtained by maintaining the copper at about 410–425° C. Satisfactory results are obtained with copper having a temperature of about 350–500° C. with a preferred range of 400–450° C. Conversion efficiency begins diminishing rapidly below 350° C. and nitric oxide deterioration begins occurring at temperatures above 500° C. The effective life of the copper also is increased by using the copper in the presence of carbon. Sufficient amounts of oxygen of course must be present for the ammonia conversion.

The mechanism of the conversions is not understood in its entirety. Preliminary investigations indicate that molybdenum is oxidized by the nitrogen dioxide conversion and the resulting molybdenum oxide subsequently is reduced by the carbon associated therewith. A similar mechanism apparently occurs in the use of copper to convert nitrogen dioxide while any ammonia is oxidized catalytically by the copper.

Chemiluminescent techniques of the types disclosed in the aforementioned Colvin et al. and Warnick et al. applications preferably are used to measure the nitric oxide in the gaseous mixtures resulting from the converters. Such detectors are rapid, accurate, and insensitive to widely varying proportions of carbon monoxide, carbon dioxide, sulfur dioxide, and water vapor; some of these are almost always present in exhaust gases and others are produced during the nitrogen dioxide and ammonia conversions. Non dispersive infrared instruments and electrolytic techniques of measuring the nitric oxide resulting from the converters also can be used.

Gaseous mixtures known to contain only one or two of the compounds can be analyzed with simplified techniques and a broader range of operating conditions. For example, the nitrogen dioxide in mixtures containing only nitric oxide and nitrogen dioxide can be converted by contact with molybdenum, manganese, silver, vanadium, tungsten, or copper. Slightly higher temperatures can be used with mixtures known to be free of nitric oxide. Mixtures known to contain ammonia only can be analyzed directly by contacting the mixtures with copper and measuring the resulting nitric oxide. Other gases convertible to nitrogen oxide or ammonia also can be analyzed.

DETAILED DESCRIPTION

Figure 1:
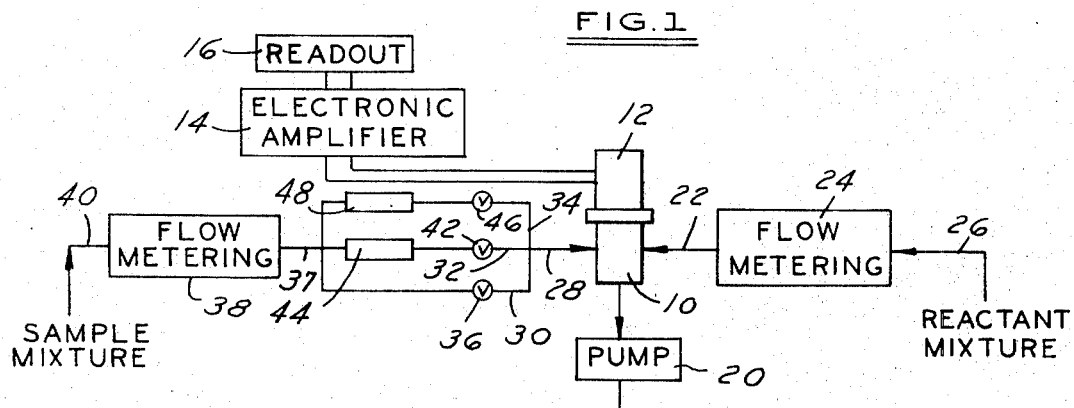
FIG. 1 is a schematic illustrating the location of a nitrogen dioxide converter and an ammonia converter of this invention between the sample mixture flow metering device and the reaction chamber of a chemiluminescent detector. The converters are located in parallel with each other and with a direct connection that permits measurement of the nitric oxide in the original mixture.

Referring to FIG. 1, a chemiluminescent reaction chamber 10 has a photomultiplier device 12 attached to one end. The output leads of the photomultiplier device are connected through an electronic amplifier 14 to a readout device 16. An outlet conduit is connected to the other end of reaction chamber 10 and a vacuum pump 20 is connected to the outlet conduit.

A reactant conduit 22 connects a reactant flow metering device 24 to the interior of reaction chamber 10. A conduit 26 supplies appropriate reactant mixture to flow metering device 24.

A sample conduit 28 connects the junction of three conduits 30, 32 and 34 with the interior of reaction chamber 10. A valve 36 connects conduit 30 through another three-way junction 37 to a sample mixture flow metering device 38. Gaseous sample mixture is supplied to flow metering device 38 by a conduit 40.

Conduit 32 is connected through a valve 42 in series with a nitrogen dioxide converter device 44 to junction 37 and flow metering device 38. Similarly, a valve 46 in series with an ammonia converter device 48 connects conduit 34 with flow metering device 38. Additional details of reaction chamber 10 and flow metering devices 24 and 38 can be found in the aforementioned Warnick et al. and Colvin et al. applications.

Figure 2:
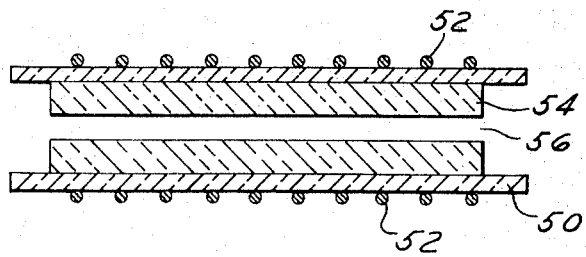
FIG. 2 is a sectional view of a converter having the appropriate metal dispersed on a carbon tube.

Turning to FIG. 2, each of the converter devices 44 and 48 comprises a cylindrical quartz tube 50 that has a resistance wire heating coil 52 surrounding its exterior. Heating coil 52 is connected to an appropriate power source (not shown). A carbon tube 54 is fitted tightly within quartz tube 50. Carbon tube 54 contains a longitudinal passage 56 that extends for its entire length.

Passage 56 of the tube in nitrogen dioxide converter 44 contains finely divided particles of molybdenum, and passage 56 of the tube in ammonia converter 48 contains finely divided particles of copper. The metal particles in each passage contact any gaseous mixture passing through the passages and also contact the carbon of the tube. Each tube 54 is manufactured by drilling passage 56 in a solid rod of spectrographic carbon, immersing the tube in an ammonia solution of molybdenum oxide for converter 44 and an aqueous solution of copper acetate for converter 48, maintaining the immersed tube in a vacuum to degassify at least a portion of the tube, drying the tube, and reducing the deposited metal salts by heating in hydrogen.

In operation, sufficient electrical energy is supplied to coil 52 to heat the molybdenum particles on the carbon tube of converter 44 to about 475° C. and the copper particles on the carbon tube of converter 48 to about 410° C. A gaseous sample mixture containing an unknown quantity of nitric oxide, nitrogen dioxide, and ammonia is supplied by conduit 40 to metering device 38. A reactant mixture typically containing about 2 percent ozone and the balance oxygen is supplied to reactant flow metering device 24. Metering devices 24 and 38 cooperate with pump 20 to produce the desired pressure within reaction chamber 10. Such pressures preferably are about 5 Torr or above.

Valves 42 and 46 initially are closed and the gaseous sample mixture passes through open valve 36 to enter the reaction chamber via conduit 28. The chemiluminescence of the reaction between any nitric oxide in the sample mixture and the ozone in the reactant mixture is recorded from readout device 16.

Valve 36 then is closed and valve 42 is opened so the gaseous sample mixture leaving metering device 38 passes through the nitrogen dioxide converter 44 on its way to the reaction chamber. Any nitrogen dioxide in the sample mixture is converted quantitatively to nitric oxide, which adds to the nitric oxide in the original sample mixture. The resulting quantity of nitric oxide in the gaseous mixture entering the reaction chamber is measured and recorded, and a simple computation produces the amount of nitrogen dioxide in the original sample mixture.

Valve 46 then is opened and valve 42 is closed so the gaseous sample mixture leaving metering device 38 passes through ammonia converter 48 on its way to reaction chamber 10. Any nitrogen dioxide and ammonia in the sample mixture are converted quantitatively to nitric oxide, which adds to the nitric oxide in the original sample mixture. Appropriate measurements and substractions produce the amount of ammonia in the original mixture.

Tubes 54 of each converter that are 5 inches long with a passage 56 about ⅛ inch in diameter and an outside diameter of ¼ inch perform satisfactorily over wide concentration ranges. Metal solutions containing about one percent metal are used typically to apply the metals to the tubes although widely varying concentrations can be used. Analyses indicate that the length, size and shape of the converters and the solution concentrations can be varied considerably.

The metals of the converters also can be applied to the carbon by vapor deposition, spraying, or vacuum immersion in aqueous or nonaqueous solutions or dispersions. Instead of applying the metals to the carbon, carbon particles can be applied to a tube of the appropriate metal.

For example, a satisfactory ammonia and nitrogen dioxide converter has been obtained by coating a copper tube with a dilute sugar solution and carbonizing the sugar. During operation of converters having the metals thereof in contact with carbon of any form, the absorption and adsorption properties of the carbon must be in equilibrium with the gaseous mixture to avoid erroneous results. It is for this reason that dense forms of carbon are preferred.

Sample mixtures from the atmosphere, stored exhaust gases from automotive engines and many other sources generally contain relatively large quantities of nitrogen dioxide and relatively small quantities of ammonia. A nitrogen dioxide converter made up of molybdenum at about 475° C. converts all of the nitrogen dioxide and only about 5 percent of any ammonia, so that a simple subtraction produces a useful approximation of the amount of nitrogen dioxide in such mixtures. For sample mixtures containing higher amounts of ammonia or for increased accuracy, one can measure the total amount of ammonia and adjust the reading from the nitrogen dioxide converter to take into account the minor ammonia conversion in the nitrogen dioxide converter. Empirically determined values of the proportion of ammonia conversion in nitrogen dioxide converters containing one of the other aforementioned metals can be used in a similar manner if desired.

Thus this invention provides processes and devices for quantitatively converting the nitrogen dioxide and ammonia of gaseous mixtures to nitric oxide. The resulting concentrations of nitric oxide can be measured by chemiluminescent techniques to determine the amounts of nitric oxide, nitrogen dioxide and ammonia in the original gaseous mixtures.

We claim:

1. A process for measuring the amount of ammonia in a gaseous mixture containing quantities of nitric oxide and nitrogen dioxide comprising
   contacting the gaseous mixture with copper at an elevated temperature to convert substantially all ammonia to nitric oxide, and
   measuring the amount of nitric oxide in the resulting gaseous mixture.

2. The process of claim 1 in which the copper has a temperature of about 400–425° C.

3. The process of claim 1 in which the copper is dispersed on the surface of a carbon member.

4. The process of claim 3 in which the carbon member is made of carbon having a density of at least about 90 percent of theoretical.

5. The process of claim 1 in which the contacting step comprises contacting the gaseous mixture with copper having a temperature of about 350–500° C.

6. The process of claim 5 in which the copper is dispersed on the surface of a carbon member.

7. The process of claim 6 in which the carbon member is made of carbon having a density of at least about 90 percent of theoretical.

8. A process for measuring the amount of nitrogen dioxide in a gaseous mixture comprising
   contacting the gaseous mixture with a material selected from the group consisting of molybdenum, vanadium, tungsten, manganese, silver and copper at an elevated temperature of about 350°–550° C. to convert substantially all of the nitrogen dioxide to nitric oxide, and
   measuring the amount of nitric ovide in the resulting gaseous mixture.

9. The process of claim 8 that also measures the amount of ammonia in the gaseous mixture comprising
   contacting the gaseous mixture with copper at an elevated temperature to convert substantially all nitrogen dioxide and ammonia to nitric oxide, and
   measuring the amount of nitric ovide in the resulting mixture.

10. The process of claim 8 in whcih the measuring step comprises introducing the resulting gaseous mixture into a reaction chamber, introducing a reactant capable of producing chemiluminescence when reacting with the nitric oxide in the resulting gaseous mixture into the reaction chamber, and measuring the chemiluminescence of the reaction.

11. The process of claim 8 in which the selected material is dispersed on the surface of a carbon member.

12. The process of claim 11 in which the carbon member has a density of at least about 90 percent of theoretical.

13. The process of claim 8 in which the contacting step comprises contacting the gaseous mixture with molybdenum having a temperature of about 400–550° C.

14. The process of claim 13 in which the molybdenum is dispersed on the surface of a carbon member.

15. The process of claim 8 in which the contacting step comprises contacting the gaseous mixture with molybdenum at a temperature of about 450–500° C.

16. The process of claim 15 in which the measuring step comprises introducing the resulting gaseous mixture into a reaction chamber, in introducing a reactant capable of producing chemiluminescence when reacting with the nitric oxide in the resulting gaseous mixture into the reaction chamber, and measuring the chemiluminescence of the reaction.

17. The process of claim 16 that also measures the amount of ammonia in the gaseous mixture comprising contacting the gaseous mixture with copper at an elevated temperature to convert substantially all nitrogen dioxide and ammonia to nitric oxide, and measuring the amount of nitric oxide in the resulting gaseous mixture.

18. The process of claim 17 in which the copper is dispersed on the surface of a carbon member.

19. The process of claim 18 in which the copper is at a temperature of about 350–500° C.

20. The process of claim 19 in which the copper is at a temperature of about 400–425° C.

References Cited

UNITED STATES PATENTS 3,647,387   3/1972   Benson et al. ......... 23—232 R

MORRIS O. WOLK, Primary Examier

R. M. REESE, Assistant Examiner

U.S. Cl. X.R.

423—237, 239, 403, 405